May 13, 1947. P. S. HARPER ET AL Re. 22,877

GAS BURNER

Original Filed Feb. 19, 1941 3 Sheets-Sheet 1

Inventors.
Philip S. Harper.
George F. Turner.
By Williams, Bradbury & Hinkle
Attys May 13, 1947. P. S. HARPER ET AL Re. 22,877
GAS BURNER
Original Filed Feb. 19, 1941 3 Sheets-Sheet 2
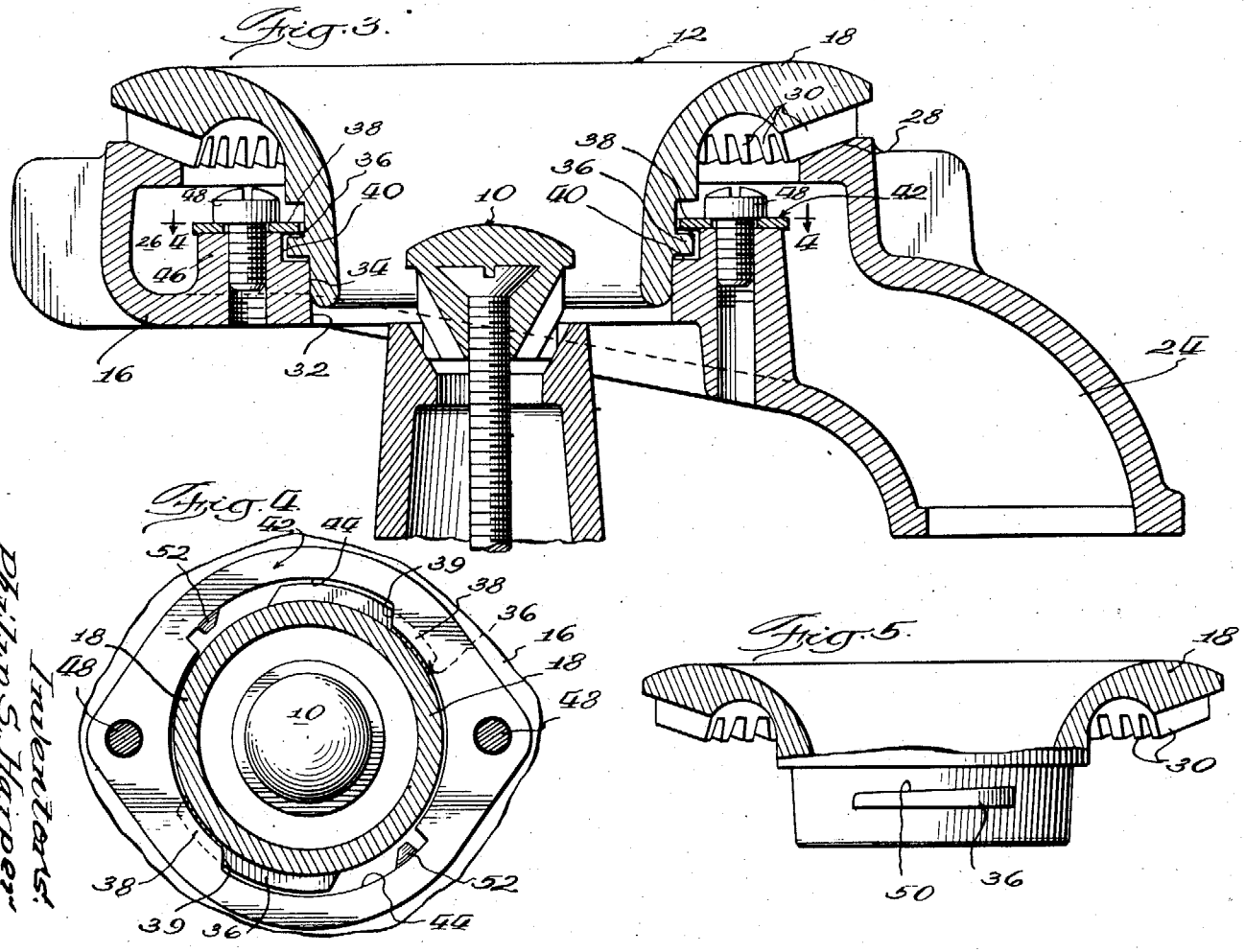
Inventors:
Philip S. Harper
George F. Turner
By Williams, Bradbury & Hulls
Attys.

GAS BURNER

Original Filed Feb. 19, 1941 3 Sheets-Sheet 3

Inventors
Philip S. Harper
George F. Turner
By
Williams, Bradbury & Hulka
Attys.

Reissued May 13, 1947 Re. 22,877

UNITED STATES PATENT OFFICE 22,877

GAS BURNER

Philip S. Harper and George F. Turner, Chicago, Ill., assignors to Harper-Wyman Company, Chicago, Ill., a corporation of Illinois Original No. 2,386,113, dated October 2, 1945, Serial No. 379,618, February 19, 1941. Application for reissue March 21, 1946, Serial No. 655,936

24 Claims. (Cl. 158—116)

The present invention relates to gas burners and more particularly to burners of the type comprising a burner base and a burner head made of material having a greater coefficient of expansion than the base and to burners comprising detachably secured base and head portions.

In the interest of economy and simplicity of detachability for cleaning, repair and the like, it has heretofore been proposed to construct gas burners of two parts, one called the burner head and the other a burner base. The burner head is ordinarily made of aluminum and the base from cast iron. According to one mode of construction, the base and head are provided with threaded portions whereby they are detachably secured. This construction has several disadvantages. For instance, if the threads are tight, it is difficult to remove the burner head and if they are loose, the assembly will not be gas tight. The burner heads are made with shanks of different lengths, one form having a short shank and another a long shank. Burner heads with short shanks are distorted because of alternate heating and cooling with the result that the threads are destroyed as is the seal constituted thereby. Alternate heating and cooling of burner heads having long shanks results in the freezing of the threads of the aluminum head to those of the cast iron base. The threads are also likely to strip or cross so as to render the burner head unfit for use. Furthermore, a burner head with a threaded shank is very likely not to be threaded into the base as far as it should be with the result that the port area is materially changed and the burner rendered inefficient in operation.

According to another mode of construction, the burner head and base have been constructed with a thermal seal, i. e., a seal comprising head and burner portions normally having some clearance therebetween and depending upon the greater expansion of the aluminum head to take up the clearance when the burner is in operation. According to this construction, the burner head is formed with an integral central bar apertured to receive means for fastening it to the base, which may either be formed with a central bar or have associated with it separate structure forming the equivalent of a central bar. Where this separate structure has been used, it has been made of resilient material in order to permit relative movement between the head and base resulting from the use of materials having unequal coefficients of expansion.

The construction using central bars is also objectionable because the bars interfere with the supply of secondary air to the burner, do not permit use of central simmer burners, and spoil the appearance of the burners. Furthermore, it is relatively difficult to assemble and disassemble the burner.

It is an object of the present invention to provide a new and improved gas burner embodying a thermal seal that is compact and economical to make.

A further object of the present invention is to provide a new and improved gas burner having a thermal seal and fastening means that do not interfere with the supply of secondary air to the burner and also permitting the use of a central simmer burner.

Another object of the present invention is the provision of a new and improved, two-part gas burner, the head of which may be quickly and securely fastened in place and readily removed for cleaning.

Another object of the present invention is to provide a new and improved gas burner constructed with an improved thermal seal and with improved fastening means.

A further object of the present invention is to provide a new and improved, two-part gas burner wherein the fastening means is located within the burner, is resilient in construction, and comprises structure formed as part of the seal defining portion of the burner head.

Other objects and advantages of the present invention will become apparent from the ensuing description, in the course of which reference will be had to the accompanying drawings, in which:

Fig. 3 is a fragmentary vertical cross-sectional view upon an enlarged scale of the burner illustrated in Figs. 1 and 2, the view being taken along the line 3—3 of Fig. 1 and illustrating details of construction of the burner head and base;

Fig. 4 is a fragmentary horizontal cross-sectional view taken along the line 4—4 of Fig. 3, but with the head in a different angular position relative to the base;

Fig. 5 is a side elevational view, partly broken away, of a burner head;

Figure 1:
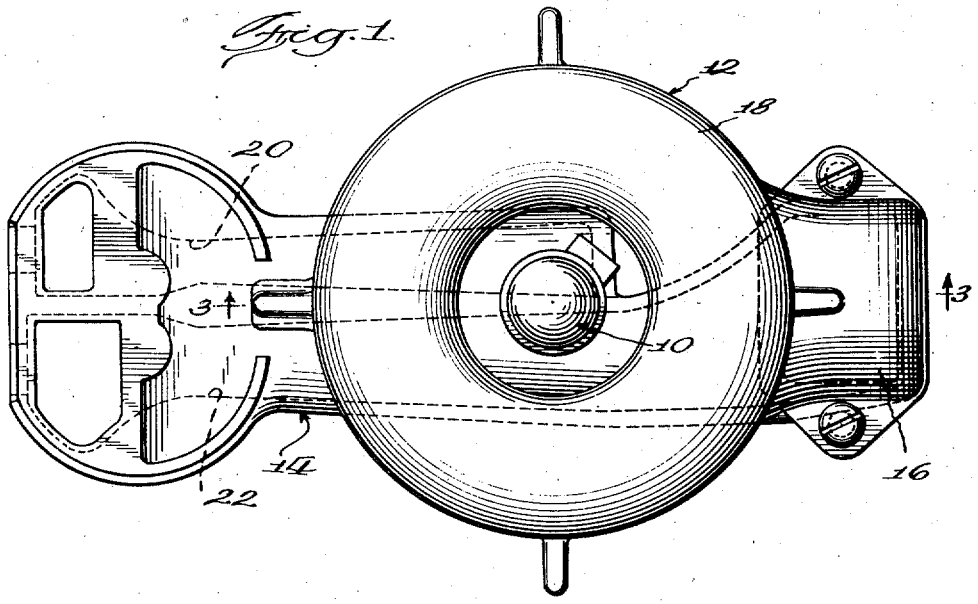
Fig. 1 is a top plan view of a burner constructed in accordance with the present invention.
Figure 2:
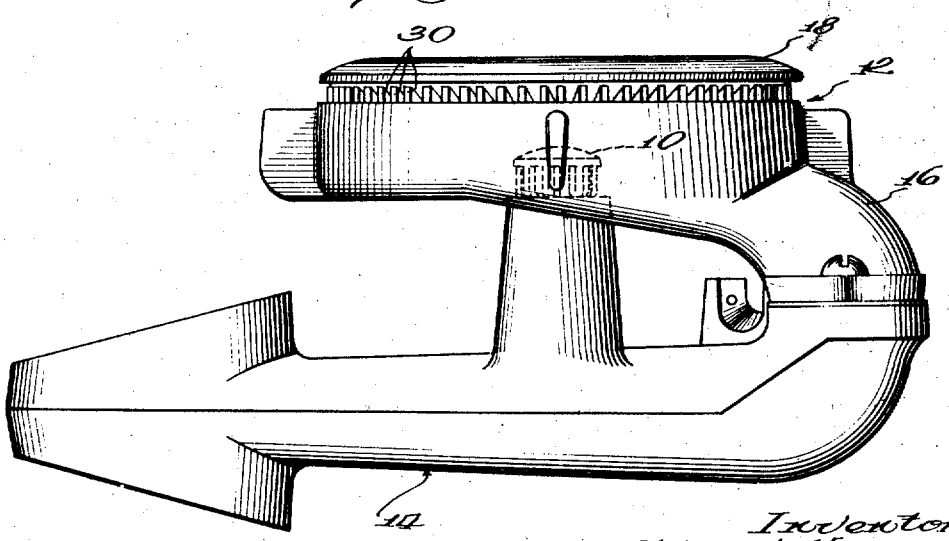
Fig. 2 is a side elevational view of the burner illustrated in Fig. 1.

Referring now to the drawings and particularly to Figs. 1 to 5, inclusive, it may be noted that the burner illustrated therein is of the double burner type, comprising simmer and main burner sections 10 and 12, respectively, mounted upon a cast iron mixing tube 14. The main burner section 12 embodying the present invention consists of a cast iron base 16 secured to the mixing tube by a plurality of screws and an aluminum head 18 removably fastened to the base in a manner to be described fully hereinafter. The mixing tube is a conventional cored cast iron casting having therein a small mixing tube 20 and a large mixing tube 22 through which gas is supplied to the simmer and main burner sections in a manner easily ascertainable from a glance at Figs. 1 and 3 under the control of a valve, not shown, which may be of any suitable construction.

The base 16 is provided at one end with a passageway 24, one end of which communicates with the large mixing tube 22 and the opposite end of which opens into an annular burner chamber 26 defined by the base and head. The outer wall of the base terminates in a flat inclined annular surface 28 that is cooperatively associated with circumferentially spaced apart teeth 30 formed at the outer under edge of the top member to form a plurality of spaced-apart gas outlet ports. The base also has an inner cylindrical surface 32, inclined slightly from the vertical, forming with an opposed similarly inclined surface 34 of the burner top a thermal seal. The two cylindrical surfaces are dimensioned so that the top and base members may be easily brought, when unheated, into assembled relation and then rotated to lock them in assembly as will be described shortly. When the burner is heated during operation of the burner, the aluminum head expands against the cast iron and the surfaces 32 and 34 effectively seal the burner chamber 26 from the atmosphere.

The improved fastening means of the present invention is of novel construction and so arranged that the burner head may be assembled and fastened to the base very easily and quickly detached for cleaning or for any other purpose. This fastening means comprises cooperatively associated interengaging structure on the head and base, whereby the head may be inserted into the base and then rotated to lock it in place. In the embodiment being described the head is provided with a pair of substantially horizontally disposed spaced apart arcuate projections, such as the lugs 36, and the base with diametrically opposed projections, such as the shoulders 38, adapted to restrain movement of the head when the latter is rotated to bring more or less of the lugs underneath the shoulders to engage the latter.

The lugs 36 are preferably formed integrally with the head and extend a short distance radially outward from the surface 34, as best illustrated in Figs. 3, 4 and 5. The lugs are located above the seal defined by surfaces 32 and 34 and extend into an annular recess defined by a peripheral shoulder 40 formed in the base immediately above the surface 32, as best illustrated in Fig. 3.

The shoulders 38 are preferably formed as integral parts of a lock washer, indicated generally by reference character 42, although other forms of construction may be used. In order that the burner head with its lugs may be inserted into the base, the lock washer is provided with opposed arcuate recesses 44 of lengths somewhat greater than the lugs. The lock washer is preferably seated upon an annular boss 46 set radially outward from sealing surface 32 and formed integrally with the base. It is secured in place by a pair of screws 48 located approximately halfway between the ends of the shoulders 38 and threaded into tapped openings in the base. It should be noted that diametrically opposite posts could be utilized in place of the annular boss 46 properly to locate the lock washer.

Resiliency is imparted to the fastening means to prevent undue stresses in the burner head as a result of its greater expansion when heated by making the lock washer of relatively thin metal and so constructing and arranging it relative to the head that it will give a few thousandths of an inch.

As has already been indicated, the burner is alternately heated and cooled in use. The result is a tendency of the burner parts to distort, particularly the aluminum head, and if no means were provided for adjustment of the parts after installation, and the head more or less fixedly secured to the base, as in the past, the port area would be variable and the burner likely to become inefficient. These difficulties are in part overcome by the resiliency of the fastening means which has a tendency to decrease the stresses. However, further adjustment is possible with the construction of the present invention to insure satisfactory operation of the burner over a long period of time.

The construction by means of which this further adjustment is made possible includes the feature of making the interengaging surfaces of the lugs 36 and shoulders 38 so that the head may be moved downward relative to the base after distortion has taken place, whereby the gas outlet port defining surface 28 and teeth 30 may be maintained in abutting engagement. This is preferably accomplished by inclining the top surfaces 50 of the lugs 36 slightly from the horizontal. A satisfactory inclination is a No. 6 pitch.

When the upper surface is so inclined, the lugs are so dimensioned that, when the head is initially assembled on the burner, approximately one-third of each lug is underneath its respective shoulders, as illustrated in Fig. 4. After a period of use, as much as two-thirds of the lugs may be underneath the shoulder, thus leaving the remaining one-third as a safety measure, as indicated in Fig. 3. Continued movement of the head in tightening direction to a point where the head may be removed is prevented by a pair of stops 52 formed by bending down the ends of shoulders 38. It is preferable also to dimension the lugs 36 so that their bottom surfaces do not strike the bottom of the annular shoulder 40 even when the lugs are rotated to be completely under shoulders 38 in order to prevent variations in port area and to minimize stresses resulting from expansion of the head.

The construction and arrangement of the lugs 36 relative to the shoulders 38 is such that the points of contact between the two are at the ends 39 of the shoulders until the lugs are moved entirely underneath the shoulders. These ends are located some distance from the fastening screws 48 and at a point where the lock washer is quite narrow, as best illustrated in Fig. 4, so that the lock washer will give the required degree when the burner head expands. Furthermore, the lugs 36 are of such length that, even when moved against the stops 52, the points of contact are distant from points radially inward from the screws 48.

From the foregoing description it may be noted that the burner parts may be made simply and economically and the burner may be quickly assembled or disassembled. The fastening means is located entirely within the burner with the result that the appearance of the burner is enhanced and a central simmer section may be used as the center of the burner is entirely open. Furthermore, there is no interference whatever with the supply of secondary air to either the main or simmer burner sections.

Figure 6:
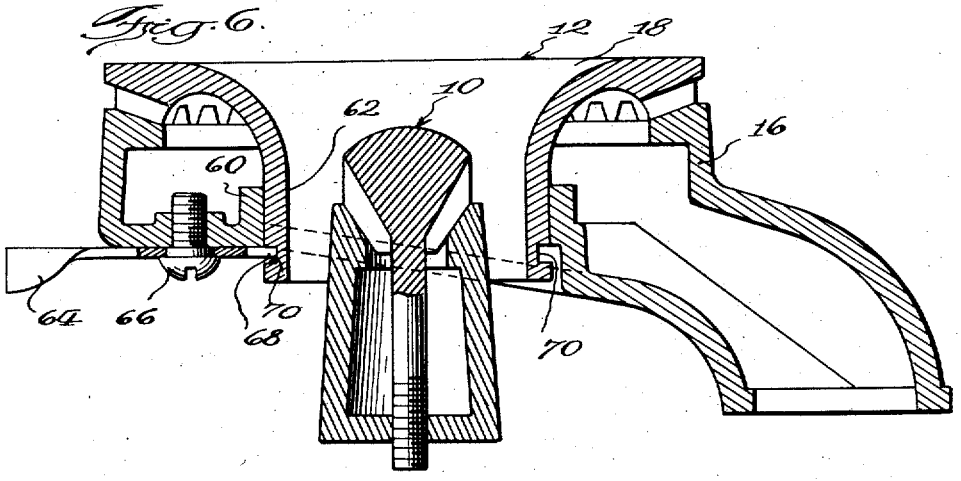
Fig. 6 is a view similar to Fig. 3 of a modified form of burner constructed in accordance with the present invention.

The embodiment of the invention illustrated in Fig. 6 discloses a somewhat different fastening means rendering it possible to simplify the burner base and head structures. The base is provided with an annular inner cylindrical seal defining wall 60 extending upwardly and the head with an inner downwardly extending cylindrical wall 62. In this embodiment the walls are not inclined but they are dimensioned to fit loosely when cold and to form a tight seal when heated.

Figure 8:
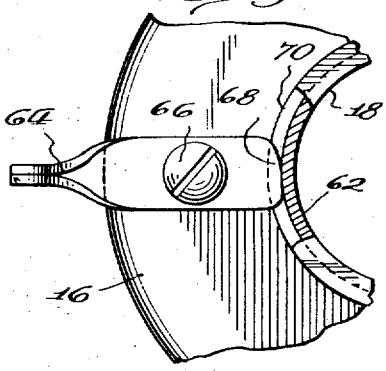
Fig. 8 is a framentary bottom plan view, also partly broken away, illustrating details of the securing means holding the burner head and base in assembled relation, which securing means is used in the embodiments of Figs. 6 and 7.

The fastening means comprises a lever 64 pivotally secured between its ends to the bottom of the base by a screw 66 and having a slightly rounded end 68 manually movable to engage the bottom of a peripheral groove 70 located at the lower end of wall 62 below the thermal seal, as best illustrated in Figs. 6 and 8. The lever does not materially interfere with the expansion of the head when the latter is heated so that there is no danger of deformation of the head. If desired, the bottom of the base could be provided with a camming surface near the screw 66 so that the rounded end 68 of the lever would tend to move the head downward as the lever is rotated and yet provide sufficient resiliency to permit movement of the head as it expands when heated.

Figure 7:
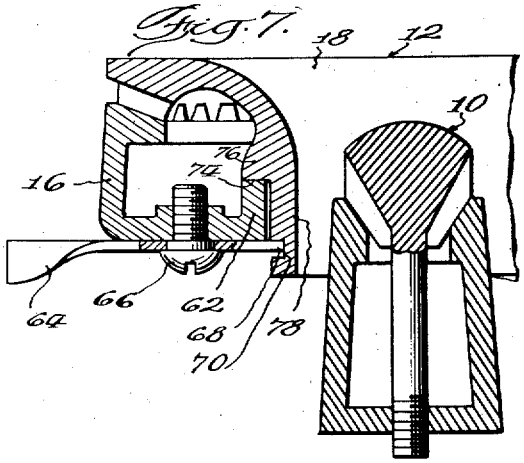
Fig. 7 is a fragmentary vertical cross-sectional view of a further modified form of burner.

The fastening means of Figs. 6 and 8 may be used to good advantage with a seal constituted by two horizontally disposed surfaces as illustrated in Fig. 7. In the embodiment of this figure the base 16 is of the same construction as that of Figs. 6 and 8, but the top edge 74 of wall 62 is used as a sealing surface. The head 18 is provided with an annular shoulder 76, the bottom surface of which rests upon the top edge of wall 62 and therewith constitutes a seal. Since the seal is constituted by horizontally disposed surfaces, the lower end 78 of head 18 need not fit closely within the wall 62. The fastening means of this embodiment corresponds to that of Figs. 6 and 8 and, therefore, will not be described in detail at this point.

Figure 9:
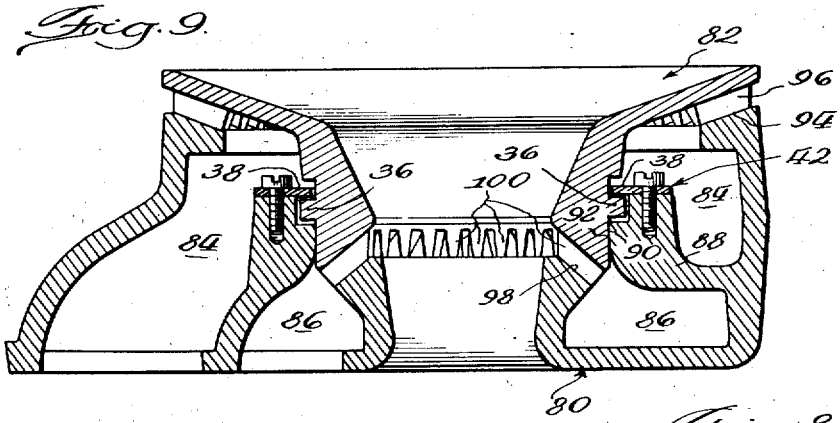
Fig. 9 is a fragmentary vertical cross-sectional view of another embodiment of the present invention.

The principles of the present invention are not limited in their application to single burners or to double gas burners wherein the two burner sections are constituted by more or less independent structures as in those heretofore described. The principles may be applied equally well to burners wherein the two burner sections are constituted by a single head and a single base, as illustrated by the embodiment of the invention shown in Fig. 9, to which reference will now be had.

The burner comprises base and head portions indicated generally by reference characters 80 and 82 held in assembled relation by fastening means corresponding identically in construction with that of the embodiment of Figs. 1 to 5 and the description of which it is not deemed necessary to repeat. The base and head are configured to form between them a main burner chamber 84 and a simmer burner chamber 86, separated by a wall 88 formed integrally with the base. The wall extends inwardly and then upwardly from the outer wall of the base and the upwardly extending portion is constructed to receive the lock washer 42 and with an inner cylindrical surface 90. The burner head is constructed with a cylindrical surface 92 opposite surface 90 and these two surfaces form a thermal seal, just as surfaces 32 and 34 of the base and head of the first described embodiment. The main burner section gas outlet ports are constituted by the inclined top edge 94 of the outer wall of the base and teeth 96 formed at the outer under edge of the top, as in the first described embodiment. The simmer burner section gas outlet ports are defined by the inclined top edge 98 of the inner wall of the base and teeth 100 formed integrally in the lower end of the top at points opposite and extending below the seal defining surfaces 90 and 92 of the base and head, respectively.

From the foregoing it may be noted that the principles of the present invention may be advantageously utilized in the construction of different types of gas burners and it should be understood the specific details of the embodiments described herein are not intended to be limitative of the invention except in so far as set forth in the accompanying claims.

What we claim as new and desire to secure by United States Letters Patent is as follows:

1. A gas burner, including in combination, a burner base having a central opening defined by an inner wall and having also an outer wall, a burner head of material having a materially greater coefficient of expansion than the base and having a central opening defined by an inner wall and structure extending upward and outward therefrom and cooperating with the base to form a burner chamber, the outer wall of said base and the outwardly extending structure of said head being constructed with inclined abutting surfaces configured to define gas outlet ports and the inner walls with surfaces arranged to form a gas seal, and means for detachably fastening said burner head to said base, said last mentioned means including interengaging elements on the base and head, certain of said interengaging elements being resilient to provide for limited vertical relative movement between the base and head after the latter are assembled, and said interengaging elements being disposed to one side of the seal and away from said central openings.

2. A gas burner, including in combination, a burner base having a central opening defined by an inner generally vertically extending wall and having also an outer wall the top of which is inclined inwardly and downwardly, a burner head of material having a materially greater coefficient of expansion than the base and having a central opening defined by a generally vertically extending wall, and structure extending into abutting contact with the inclined top of the outer wall of said base to form with said base a burner chamber, the inner walls of said base and head being provided with cylindrical surfaces of substantial length dimensioned loosely to fit one within the other when unheated and to form a gas seal when the burner is heated in operation, and means including structure on the base and head interengageable upon rotation of the head relative to the base and located to one side of the seal defining surfaces of the base and head for fastening the two in assembled relationship.

3. A gas burner, including in combination, a burner base having a central opening defined by an annular inner generally vertically extending wall and having also an outer wall, a burner head of material having a materially greater coefficient of expansion than the base, a central opening defined by an annular generally vertically extending wall, and a generally upwardly and outwardly extending structure cooperating with said base to form a burner chamber, the upper end of the outer wall of said base and the outer end of said head being provided with abutting inclined surfaces configured to form gas outlet ports, the inner wall of said head being dimensioned to fit loosely within the inner wall of the base when the burner is unheated and to form a gas seal when the burner is heated in operation, and means for detachably securing the burner head to the base, said last mentioned means including interengaging structure on the base and head, certain of said structure being resilient to provide for limited vertical movement between the base and head after the latter are assembled, and said structure being disposed to one side of the seal and away from the central openings.

4. A gas burner, including in combination, a burner base having inner and outer wall-defining structure, a burner head having an inner wall-defining structure and structure cooperating with said base to form a burner chamber and gas outlet ports, the inner walls of said base and head being so dimensioned and having opposed substantially horizontally disposed arcuate projections of lengths such and so located that the head may be fastened to said base by placing it on the base with its projections between those on the base and then rotating it relative to the base to bring the projections thereon below those on the base, certain of said projections being slightly resilient to permit relative movement of the base and head after the two have been fastened.

5. A gas burner, including in combination, a burner base having inner and outer wall defining structure, a burner head of a material having a materially greater coefficient of expansion than the base, said head having an inner wall defining structure and structure cooperating with said base to form a burner chamber and gas outlet ports, the inner walls of said base and head being so dimensioned and having opposed substantially horizontally disposed projections of lengths such and so located that the head may be fastened to the base by placing it on the base with its projections between those on the base and then rotating it relative to the base to bring the projections thereon below those on the base, the projections on said base being slightly resilient and constituted by separate structure secured to said base.

6. A gas burner, including in combination, a burner base having an annular generally vertically extending wall and an outer wall, a burner head of material having a greater coefficient of expansion than the base and comprising an annular generally vertically extending wall and generally upwardly and outwardly extending structure cooperating with said base to form a burner chamber, the upper end of the outer wall of said base and the outer end of said head having abutting surfaces, the annular wall of said head being dimensioned to fit loosely within the annular wall of said base when the burner is unheated and to form a gas seal therewith when the burner is heated in operation, the annular wall of said head having a pair of opposed substantially horizontal arcuate lugs extending outwardly therefrom and located above the seal defining portion thereof, and a lock washer secured to the annular wall of said base above said arcuate shoulders for fastening the head to the base, said lock washer having a pair of opposed recesses of a size to permit passage of said arcuate lugs thereby and a pair of opposed shoulders adapted to fasten the head in place when the latter is rotated to bring the lugs underneath the shoulders.

7. In a gas burner according to claim 6, wherein the lock washer is made of slightly resilient metal.

8. In a gas burner according to claim 6, wherein the lock washer is provided with stops extending into the path of movement of the arcuate lugs on the head for determining the limit of angular movement of the head relative to the base.

9. In a gas burner according to claim 6, wherein the lock washer is made of slightly resilient material and is secured to the base at points approximately opposite the midpoint of the shoulders, and the upper edges of the arcuate lugs are inclined and so located relative to the shoulders that the points of contact between the lugs and shoulders are at points distant from those at which the washer is secured to the base.

10. A single section gas burner, including in combination, a burner base having an annular generally vertically extending inner wall and an outer wall of a height greater than that of the inner wall, a burner head of material having a greater coefficient of expansion than the base, and comprising a generally vertically extending annular inner wall and generally upwardly and outwardly extending structure cooperating with said base to form a burner chamber, the upper end of the outer wall of said base and the outer end of said head being provided with abutting surfaces inclined upwardly and outwardly and configured to form gas outlet ports, the inner wall of said head being dimensioned to fit loosely within the inner wall of said base when the burner is unheated and to form a gas seal therewith when the burner is heated in operation, the inner wall of said head having a pair of opposed substantially horizontal arcuate lugs extending outwardly therefrom and located above the seal defining portion thereof, and a lock washer secured to the inner wall of said base above said arcuate lugs for fastening the head to the base, said lock washer being made of slightly resilient material and having a pair of opposed recesses of a size to permit passage of said lugs thereby and a pair of opposed shoulders of substantial length adapted to fasten the head in place when the latter is rotated to bring the lugs underneath the shoulders, said washer being secured to the top of the inner wall of the base at points approximately opposite the midpoint of the shoulders, and the upper edges of said lugs being inclined and so located relative to the shoulders that the burner head and base contact at the gas outlet port defining inclined surfaces and the ends of the shoulders in engagement with the lugs.

11. A double section gas burner, including in combination, a burner base having inner, intermediate, and outer annular generally vertically extending walls, the intermediate wall being higher than the inner wall and lower than the outer wall, a burner head of material having a materially greater coefficient of expansion than the base and comprising inner, intermediate and outer portions, said inner and outer portions being so configured and cooperating with the inner and outer walls as to define gas outlet ports for the two sections of said burner, and said intermediate portion having an annular generally vertically extending portion fitting loosely within the intermediate wall of the burner when the burner is unheated and to form a seal therewith when the burner is heated in operation, and means including outwardly extendig lugs on the intermediate portion of the head and cooperatively associated shoulders on the top of the intermediate wall of the base and above the seal defining portions for detachably securing the head to the base.

12. A gas burner, including in combination, a burner base having inner and outer annular generally vertically extending walls connected by an annular horizontally disposed base portion, a burner head having an annular inner wall extending below the base portion of said burner base and structure extending generally upwardly and outwardly from said wall cooperating with said base to form a burner chamber and gas outlet ports, said inner walls being constructed with surfaces arranged to form a gas seal, and means for detachably fastening said head to said base, said last mentioned means including a peripheral groove on the outer surface and at the lower end of the inner wall of the head and a lever pivotally secured to the base portion of the burner base having an end portion movable into said groove.

13. A gas burner, including in combination, a burner base having inner and outer annular generally vertically extending walls connected by an annular horizontally disposed base portion, a burner head of material having a greater coefficient of expansion than the burner base, said head having an annular inner wall extending within the inner wall of and below the base portion of said burner base and having structure extending generally upwardly and outwardly from said wall cooperating with said base to form a burner chamber, the outer wall of said base and the outer under edge of said head having upwardly and outwardly inclined abutting surfaces configured to form gas outlet ports, the inner walls of said head and base being dimensioned to fit loosely when the burner is unheated and to form a gas seal when the burner is heated in operation, and means for detachably fastening said head to said base, said last mentioned means including a peripheral groove on the outer surface and at the lower end of the inner wall of the head and a lever pivotally secured to the base having an end portion movable into said groove.

14. In apparatus of the class described, fastening means for securing structure having concentric annular wall defining portions, including in combination, a pair of opposed arcuate lugs on one wall disposed in a plane perpendicular to the axis of said walls, an annular shoulder formed at the outer end of said other wall of a size to receive said lugs, and a lock washer secured to the outer end of said other wall, said washer having opposed recesses of a size to permit said lugs to pass thereby and opposed shoulder defining portions to engage said lugs when the two walls are rotated relative to one another.

15. In apparatus of the class described, fastening means for securing structures having concentric annular wall defining portions made of materials having different coefficients of expansion, the combination including, a pair of opposed arcuate lugs on one wall disposed in a plane perpendicular to the axis of said walls, an annular shoulder formed at the outer end of said other wall of a size to receive said arcuate lugs, and a lock washer of slightly resilient material secured to the outer end of said other wall, said washer having opposed recesses of a size to permit said lugs to pass thereby and opposed shoulder defining portions of substantial length to engage said lugs when the two walls are rotated relative to one another, said washer being secured to the other wall at points located approximately midway between the ends of shoulders thereon, and said lugs being inclined so as to contact the washer shoulders at the ends of the latter.

16. In apparatus is claimed in claim 14, wherein the washer is provided with stop defining portions extending into the path of movement of the lugs to determine the limit of relative rotation of said walls.

17. A gas burner, including in combination, a burner base having a central opening defined by an inner wall and having also an outer wall, a burner head having a central opening defined by an inner wall and having also structure extending upward and outward therefrom into abutting engagement with the top of the outer wall of the base to form a burner chamber, the inner walls being constructed with surfaces arranged to form a gas seal, and means disposed away from said central openings and inside the chamber for detachably fastening said burner head to said base.

18. A gas burner, including in combination, a burner base having an annular generally vertically extending wall and an outer wall, a burner head comprising an annular generally vertically extending wall and generally upwardly and outwardly extending structure cooperating with said base to form a burner chamber, the upper end of the outer wall of said base and the outer end of said head having abutting surfaces, the annular wall of said head being dimensioned rotatably to fit within the annular wall of said base, the annular wall of said head having a pair of opposed substantially horizontal arcuate lugs extending outwardly therefrom, and a lock washer secured to the annular wall of said base above said arcuate shoulders for fastening the head to the base, said lock washer having a pair of opposed recesses of a size to permit passage of said arcuate lugs thereby and a pair of opposed shoulders adapted to fasten the head in place when the latter is rotated to bring the lugs underneath the shoulders.

19. A gas burner, including in combination, a burner base having inner and outer wall defining structure, a burner head having inner and outer wall defining structure cooperating with said base to form a burner chamber and gas outlet ports, the inner and outer walls of said base and head being concentrically arranged to enable the head to be rotated relative to the base, and means for detachably securing the head to the base including opposed structures on the base and head adapted to be brought into interlocking engagement upon limited rotation of the head relative to the base, the last mentioned structure on the base being somewhat resilient.

20. A gas burner, including in combination, a burner base having inner and outer wall defining structure, a burner head having inner and outer wall defining structure cooperating with said base to form a burner chamber and gas outlet ports, the inner and outer walls of said base and head being concentrically arranged to enable the head to be rotated relative to the base, and means for detachably securing the head to the base including opposed structures on the base and head adapted to be brought into interlocking engagement upon limited rotation of the head relative to the base and certain of which are somewhat resilient.

21. A detachable gas burner head having an annular generally vertical wall defining a central opening, structure extending generally outward from said wall, said wall and structure constituting part of a burner chamber wall, said head being made of material having a coefficient of expansion comparable to that of aluminum and said vertical wall having a continuous outwardly facing sealing surface, and a pair of opposed substantially horizontal burner head attaching members extending generally radially outward from said wall and located entirely above the seal defining portion of said wall.

22. A detachable gas burner head having an annular generally vertical wall defining a central opening, structure extending generally outward from said wall, said wall and structure comprising part of a burner chamber wall and said vertical wall having an annular continuous outwardly facing sealing surface, and burner head attaching means extending radially outward beyond said wall and located entirely above said sealing surface.

23. A detachable gas burner head, having an annular generally vertical wall defining a central opening, structure extending generally upwardly and outwardly from said wall and terminating in a portion having an underside inclined upwardly and outwardly, said wall and structure constituting part of a burner chamber wall and said vertical wall also having an annular continuous outwardly facing sealing surface, and burner head attaching means disposed between the top and bottom of the burner head and entirely above the seal defining portion of said wall.

24. A detachable gas burner head having an annular generally vertical wall defining a central opening, structure extending generally upwardly and outwardly from said wall and terminating in a portion having an underside inclined upwardly and outwardly, said head being made of a material having a considerably higher coefficient of expansion than cast iron and said wall including a continuous outwardly facing sealing surface, and spaced apart attaching means extending generally radially outwardly from said wall and disposed below said structure and entirely above said sealing surface.

PHILIP S. HARPER.
GEORGE F. TURNER.

REFERENCES CITED

The following references are of record in the file of this patent:

UNITED STATES PATENTS

| Number | Name | Date |
|---|---|---|
| 1,341,089 | Volk | May 25, 1920 |
| 1,714,409 | Stockstrom et al. | May 21, 1929 |
| 2,009,271 | Moecker, Jr. | July 23, 1935 |
| 2,074,531 | Becvar | Mar. 23, 1937 |
| 2,107,575 | Matthews et al. | Feb. 8, 1938 |
| 2,099,205 | Harper | Nov. 16, 1937 |
| 1,463,263 | Grayson | July 31, 1923 |
| 462,922 | Gibbons | Nov. 10, 1891 |
| 2,262,683 | Kauffman et al. | Nov. 11, 1941 |
| 1,738,216 | Wallace | Dec. 3, 1929 |
| 2,268,407 | Krone et al. | Dec. 30, 1941 |
| 1,911,659 | Weaver | May 30, 1933 |

FOREIGN PATENTS

| Number | Country | Date |
|---|---|---|
| 155,722 | Germany | Nov. 7, 1904 |
| 493,231 | England | Oct. 5, 1938 |
| 172,743 | England | Dec. 16, 1921 |
| 384,829 | England | Dec. 15, 1932 |